Aug. 31, 1965  R. MADEY  3,203,173
FISSIONABLE FUEL POWER PLANT
Filed Aug. 16, 1961  2 Sheets-Sheet 2

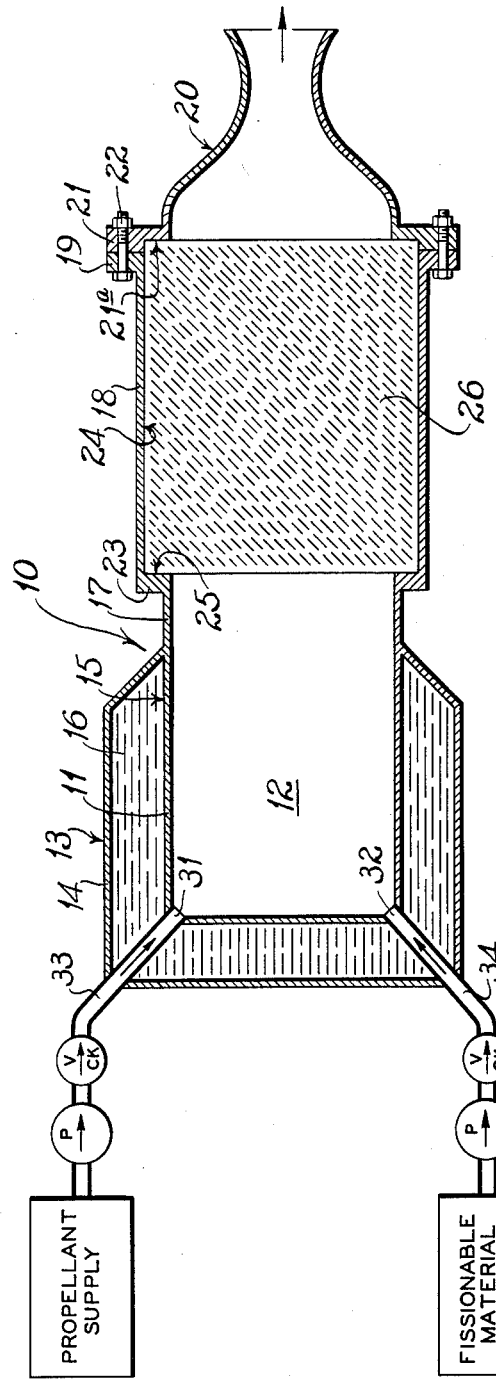

INVENTOR.
RICHARD MADEY
BY
John J. Sullivan
ATTORNEY 3,203,173
FISSIONABLE FUEL POWER PLANT
Richard Madey, Bellport, N.Y., assignor to Republic Aviation Corporation, Farmingdale, N.Y., a corporation of Delaware
Filed Aug. 16, 1961, Ser. No. 131,853
4 Claims. (Cl. 60—35.5)

This invention relates generally to power plants and, more particularly, to a power plant incorporating means for selectively separating the materials comprising the exhaust mixture therefrom.

While the present invention is not limited to, it has particular utility in, fissionable power plants or nuclear reactor systems wherein a working fluid and a fissionable fuel are mixed or blended in a common chamber to produce a gaseous mixture which is ultimately exhausted therefrom. This exhaust is employed to perform work such as to drive a turbine or to produce thrust, in which case it is usually ejected through suitable nozzle means.

The advantages of nuclear gaseous reactors over other power plant systems, such as chemical engines or nuclear rocket engines using solid fuel elements, are many. For example, gaseous reactor systems have high temperature capabilities, develop a high specific impulse, have a good thrust/payload ratio relative to their contemporary systems, etc. However, such advantages have not heretofore been realized, largely due to economic reasons. The exhaust discharge or escape of the relatively expensive fissionable material along with the working fluid from the reactor makes the operating costs of such systems prohibitive.

At the same time, the indiscriminate discharge of exhaust gas from power plants to the surrounding area is highly objectionable for its contamination and toxic effect. This objection is even greater in the case of a fissionable exhaust gas.

The present invention has in view the foregoing, as well as other, factors pertinent to power plant systems. It is herein proposed to eliminate several disadvantages presently existing in power plants and their operation. Moreover, in the case of nuclear gaseous reactors it is herein proposed to provide means whereby such reactors may be inexpensively and efficiently employed. The several advantages of the nuclear gaseous reactor over other power plant systems may thereby be realized and a superior system attained.

Stated broadly, the instant invention contemplates a power plant having a separation device operatively mounted therein forward of its exhaust end to extract a selected material from the gaseous exhaust mixture without affecting the discharge of the remaining materials of the mixture. This separation device may be removably mounted in its operative position to facilitate its replacement when saturated. It is also within the purview of the invention to operatively connect the device or separator in a nuclear gaseous reactor system to appropriate equipment for regeneration or desorption of the fissionable material and recycling it through the system.

The separation device hereby proposed is predicated upon the concept that a selected material employed in the fabrication of the device will have a preferential affinity to one of the materials, for example an objectionable or fissionable gas, in the exhaust mixture and little or no affinity to remaining materials, i.e., the working fluid therein. In other words, the materials comprising the separator and those constituting the different gases forming the exhaust mixture are matched to effect maximum adsorption of the noxious or fissionable gas without affecting the flow of working or propellant gas.

More specifically, the separator or adsorber comprises a highly porous body or plug disposed across the exhaust passage of the power plant. This plug is formed with multiple surfaces establishing a relatively large aggregate area of a material attractive to a selected gas in the exhaust, causing it to attach thereto. The composition and porosity of the plug, however, is such that the balance of the gas in the exhaust is permitted to pass therethrough with comparatively little and in some cases substantially no attendant pressure drop.

With the above and other objects in view, as will be apparent, this invention consists in the construction, combination and arrangement of parts, all as hereinafter more fully described, claimed and illustrated in the accompanying drawings, wherein:

FIG. 1 is a longitudinal section taken through a fissionable power plant or nuclear reactor as applied, by way of example, in a propulsion system to show generally an adsorber removably located therein for the separation of the fissionable gas from the working gas, the associated components of the entire propulsion system being shown in block diagram;

Figure 3:
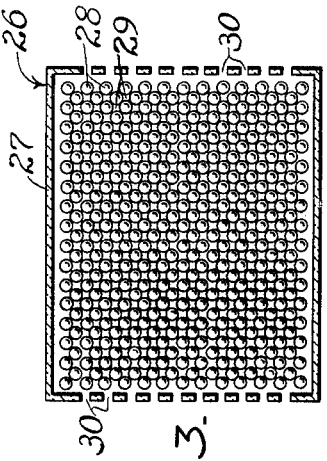
Figure 2:
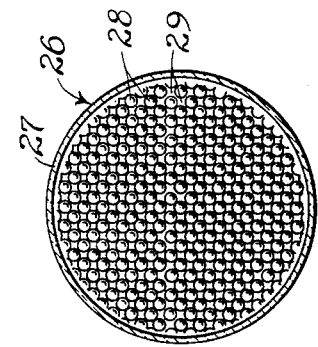
FIG. 2 is a transverse section with reference to the adsorber illustrated in FIG. 1 to show a preferred form thereof to produce maximum adsorption of the fissionable gas in the exhaust mixture and minimum effect on the propellant gas flow therethrough.
Figure 4:
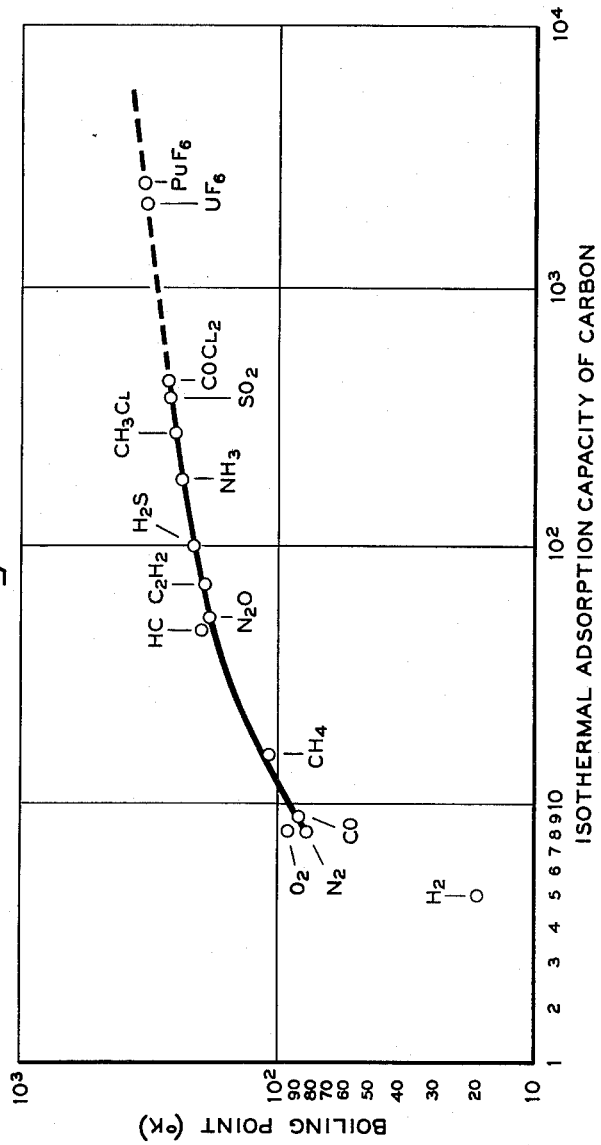

FIG. 3 is a longitudinal section with reference to the adsorber of FIG. 1 of the preferred form of adsorber shown in FIG. 2; and FIG. 4 plots logarithmically the boiling point of various fissionable and working gases which may be employed in the system contemplated herein against the isothermal adsorption capacity of a separator fabricated of one relatively good adsorbing material, viz., carbon, to show the wide variation in adsorption capacity of this material with these gases.

With particular reference to the drawings, 10 designates a fissionable or nuclear reactor which comprises a motor casing or housing 11 defining internally at one of its ends a gaseous fission chamber 12 totally surrounded by and embedded within a neutron moderating reflector 13. Preferably, the casing 11 is fabricated of a high temperature-resistant and low neutron-adsorbing material such as stainless steel. The reflector 13 preferably comprises a jacket 14 connected to the external wall of the casing 11 in any suitable manner and extending therefrom and cooperating therewith to produce a compartment 15 adapted to contain the moderating reflector material, such as heavy water 16. Metal such as beryllium or a non-metal like graphite may be employed in lieu of heavy water, it being the purpose of such material to slow down neutron movement in the reflecting material 16 and cause the neutrons to return to the chamber 12.

At its other end, the casing 11 is formed with a neck 17 from which an extension 18 projects and terminates in attachment means, such as a lateral flange 19. A nozzle 20 provided with attachment means or a flange 21 complemental to the flange 19 on the casing extension 18 is thereby disposed in abutment therewith and removably secured thereto by suitable fastening means 22.

The extension 18 is preferably of a different transverse dimension than the casing 11 and connected thereto by means of and through an offset 23 between the neck 17 and the associated end of the extension 18. A chamber 24 is thereby produced internally of the extension 18 having cross-sectional dimensions differing from those of the fission chamber 12 and defined inwardly at its opposed ends by restriction means such as a shoulder 25 formed by a surface of the offset 23 and the inner portion 21a of the nozzle flange 21.

A plug 26 having dimensions substantially equal to those of the chamber 24 is adapted to be inserted in the end of the extension 18 prior to connection of the nozzle 20 thereto. Movement of the plug 26 is limited by contact with the shoulder 25 and flange portion 21a when the nozzle 20 is secured to the casing extension 18. This plug 26 is fabricated of refractory material and, preferably, comprises a container 27 (FIG. 3) of graphite substantially filled to capacity with pellets or granules 28 of activated carbon.

For the purpose of illustration, these pellets are shown as spherical and of uniform size; however, size and shape are not to be construed as important to the inventive concept. The spaces 29 established between the several granules 28 are illustrative of the porosity of the plug 26 to establish multiple surfaces and a relatively large aggregate area both internally and externally of the granules for intimate contact with the fissionable gases of the exhaust mixture. Since the fissionable gases employed have a preferential affinity for carbon, they will attach upon contact and thus be adsorbed by the plug 26. The exhaust mixture actually passes through or penetrates the granules as well as around the granules through the spaces 29. However, since the propellant gases employed have little or no affinity for carbon, they will flow freely through and around the container 27 and granules 28 comprising the plug 26.

The opposed ends of the container 27 are perforated as at 30 to admit the products of the fission within the chamber 12 and the exhaust of the propellant gases into and through the nozzle 20. The transverse dimensions of the several perforations are less than those of the granules 28 to prevent the escape of the granules therethrough. It is the reaction of the exhaust propellant or working fluid that produces thrust in the conventional manner.

Adjacent the other end of the reactor 10, i.e., the end opposite the nozzle 20, a pair of individual and isolated ports 31 and 32 are connected to the casing 11. Each port 31 and 32 is adapted to connect and mount a suitable pipeline 33 and 34, respectively, to the chamber 12 for the passage of the fissionable fuel and the propellant therethrough. At its other end, each respective line 33 and 34 is connected to a suitable source of propellant and fissionable material supply. A pump and one-way valve is disposed in each line 33 and 34 between said respective sources and the chamber 12 for delivery of the fuel and propellant therefrom into the chamber 12.

The propellant supply may be liquid hydrogen, helium, ammonia, or any other propellants, depending upon the particular application at hand. The use of a low molecular weight propellant such as liquid hydrogen is preferred since it gives a high exhaust velocity. The fissionable supply may be any of the available fissionable materials such as, for example, uranium 235, plutonium 239, or their hexafluorides ($UF_6$, $PuF_6$). The use of easily condensable fissionable fuels is preferred, however, for the most efficient operation of the adsorber 26.

Thus, the ingredients of the fuel to be mixed or blended within the chamber 12 are delivered thereto where fission occurs, and the resulting gaseous mixture expands and is directed through the plug 26. Adsorption of the fissionable materials in this mixture occurs as above described, and the propellant gases in the mixture substantially alone are ejected through the nozzle 20 to produce forward propulsion of the reactor 10.

The affinity of the fissionable gases in the exhaust mixture from the chamber 12 to the carbon adsorber 26, as well as the relative lack of affinity of the propellant gases to the adsorber 26, is illustrated in FIG. 4. Here, the isothermal adsorption capacity of activated carbon is plotted logarithmically against the boiling point (° K.) of various gases, i.e., hydrogen ($H_2$), nitrogen ($N_2$), carbon monoxide (CO), oxygen ($O_2$), methane ($CH_4$), nitrous oxide ($N_2O$), acetylene ($C_2H_2$), hydrogen chloride (HCl), hydrogen sulfide ($H_2S$), ammonia ($NH_3$), methyl chloride ($CH_3Cl$), sulfur dioxide ($SO_2$), carbon oxychloride ($COCl_2$), uranium hexafluoride ($UF_6$) and plutonium hexafluoride ($PuF_6$). It is shown that the fissionable gases are adsorbed by the activated carbon at a temperature of, for example, 15° C., on the order of 400–500 times hydrogen which is illustrative of the propellant gases that may be employed. The adsorption capacity at this temperature for the fissionable hexafluorides is deduced by extrapolation.

What is claimed is:

1. In a thrust-producing power plant including a fission chamber adapted to receive and intimately mix a fissionable fuel and a propellant fluid producing a gaseous mixture, the combination with an outlet in the form of a nozzle in communication with said chamber for ejection of said mixture from said chamber, of a plug formed of multiple porous pellets disposed in localized area contact with one another and transversely filling an area of said power plant between said chamber and said nozzle, each of said pellets being fabricated of a material having a relatively high preferential affinity to the fissionable ingredients in said mixture and substantially no affinity to the propellant ingredients in said mixture.

2. The combination of claim 1 including an extension on said chamber terminating in attachment means for securing said nozzle, and means for removably securing said plug in said extension.

3. The combination of claim 2 wherein said extension has an internal transverse dimension greater than that of said chamber.

4. The combination of claim 3 wherein said plug comprises a container filled with said porous pellets and pierced at opposed ends with perforations having dimensions smaller than said pellets, the external transverse dimension of said container being substantially equal to said internal transverse dimension of the extension.

References Cited by the Examiner

Nuclear Rocket Propulsion, by R. W. Bussard et al., McGraw-Hill Book Co., N.Y., 1958. pp. 322–327.

Propulsion Systems for Space Flight, William R. Corliss, McGraw-Hill Book Co., N.Y., 1960, pp. 164–167.

Rockets and Guided Missiles, John Humphries, Macmillan Co., N.Y., 1956, pp. 194–197.

Aero/Space Engineering, February 1959, pp. 50–53.

Astronautics, October 1959, pp. 23–25.

Proceedings of the International Conference on the Peaceful Uses of Atomic Energy, vol. 3, United Nations, N.Y., 1955, pp. 264, 282.

Nuclear Science Abstracts: vol. 13, abstract 5,123, page 665, April-May 1959; vol. 14, abstract 17,795, pp. 2274, 2275, September-October 1960; vol. 14, abstract 16,722, p. 2127, September-October 1960; vol. 14, abstract 22,610, p. 2923, November-December 1960.

CARL D. QUARFORTH, *Primary Examiner.*

REUBEN EPSTEIN, *Examiner.*